Dec. 20, 1927.  
J. F. WATERS  
1,653,243  
STEAM COOKER  
Original Filed Sept. 27, 1923

Inventor  
John F. Waters  
By Fred Gerlach  
his Atty.

Patented Dec. 20, 1927.

1,653,243

UNITED STATES PATENT OFFICE.

JOHN F. WATERS, OF CHICAGO, ILLINOIS.

STEAM COOKER.

Application filed September 27, 1923, Serial No. 665,102. Renewed May 23, 1927.

The invention relates to steam cookers. In boiling corned-beef, ham and the like, it has been found that the flavor of the cooked product is improved when the scum and undesirable material is occasionally flushed from the container or cooking vessel and the primary object of the invention is to provide a steam cooker in which provision is made for occasional flushing of the scum and other undesirable material from the vessel, while the food is being cooked and without opening the vessel for this purpose.

The invention consists in the several novel features hereinafter set forth and more particularly defined by claims at the conclusion hereof.

Figure 1:
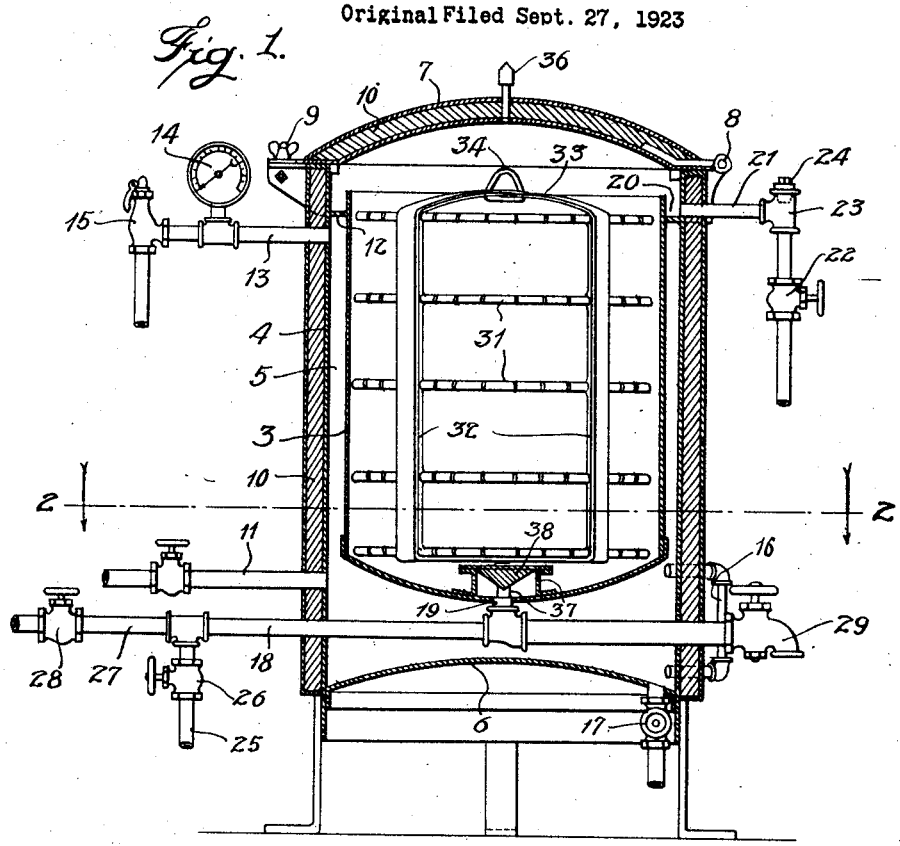
Figure 2:
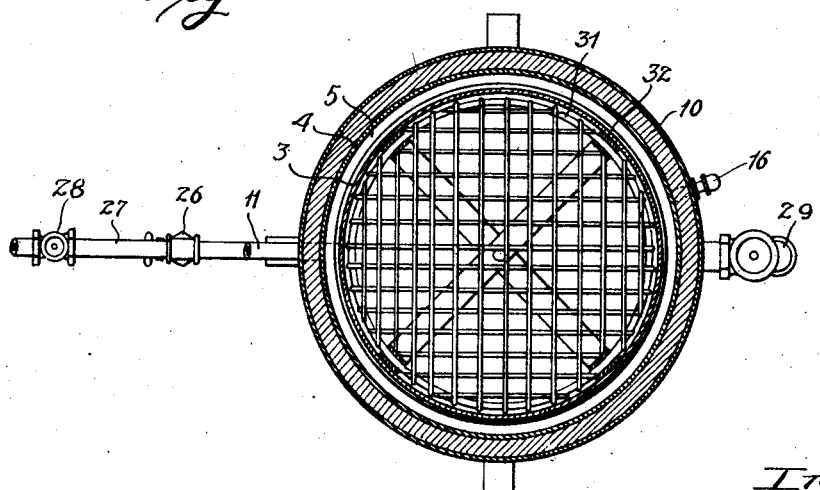

In the drawings: Fig. 1 is a vertical section of a cooker embodying the invention. Fig. 2 is a horizontal section on line 2—2 of Fig. 1.

The invention is exemplified in a structure comprising a cylindrical vessel or container 3 which is adapted to hold the food to be cooked; and a cylindrical casing which comprises a side 4, a bottom 6 and a cover 7, which is hinged to the casing, as at 8, and provided with means, such as screws 9, for clamping it on top of the casing to form a tight closure therewith. The casing is spaced from the vessel 3 so as to form a steam-chamber 5 around the side and bottom of the vessel. The side 4 and top or cover 7 of the casing are formed of inner and outer shells or walls with suitable insulating material 10 between them so that heat in the steam chamber will be retained in the casing. A pipe 11 is connected to deliver steam into the lower portion of the steam-chamber 5. A horizontal wall 12 extends across the steam-chamber below the upper end of the vessel 3, the top of which is open, so that it is in communication with the space in the upper portion of the casing. A pipe 13 is connected to the upper portion of the steam-chamber 5 and is provided with a pressure-gauge 14 so that the pressure of steam in said chamber can be ascertained and an automatic relief-valve 15 to permit the escape of steam from chamber 5 when the pressure therein becomes excessive. A water-gauge 16 is suitably connected to the lower portion of the casing so that any cumulation of water may be discerned. A drain-cock 17 is connected to the bottom 6 of the casing.

A supply pipe 18 is connected, as at 19, to deliver water through the bottom of the vessel 3 into the cooking chamber in said vessel while the vessel is closed. Horizontal wall 12 is disposed below the top margin of receptacle 3 so as to form an annular overflow groove or channel 20 for the water from the vessel. An outlet pipe 21 for the overflow water is connected to carry off water from said overflow channel. Said pipe is provided with a valve 22 to control the outflow of water and also with a fitting 23 provided with a removable screw-plug 24, which, when removed, permits an inspection of the overflow to ascertain whether scum or other undesirable material is passing off with the water. Pipe 18 is connected to receive hot water from a pipe 25 under control of a valve 26 and to receive cold water from a pipe 27 which is provided under control of a valve 28. The purpose of providing these connections is to make it possible to flush the material being cooked by admitting hot water during the cooking operation to cause it to circulate upwardly through the vessel 3 and overflow into the channel 20, carrying with it the scum and other undesirable material released from the food during the cooking operation. After the meat has been cooked, cold water is circulated through the vessel 3 to chill the meat being cooked, it having been found in practice that this chilling will close the pores of the meat, so that the juice will be retained therein when it is removed. A drain-cock 29 is connected to the bottom of vessel 3 so that the liquid contents can be drained therefrom when desired.

In cooking hams, corned-beef, tongues and the like, particularly when water is being circulated through the cooking vessel, it is desirable to prevent the pieces or chunks of meat from being packed together, so that all of their exterior portions will be flushed as desired. For this purpose, a removable rack is provided in the vessel. This rack consists of a vertical series of shelves 31, each formed of wire so the water will readily flow therethrough and bars 32, to which the shelves are secured. Bars 32 are extended to form arches 33 over the top member 31 and a loop 34 is secured thereto, so that the rack, with the material to be cooked therein, can be lowered into the vessel 3 by a suitable hoist and lifted out of it after the food has been cooked. A pop-vent 36 is usually provided in the top 7.

In the use of the cooker, the hams, chunks of corned-beef or other material to be cooked are placed on the shelves 31 while the rack is suspended above the cooker. No material is placed on the top shelf 31, so that the material to be cooked will be retained below the top of vessel 3. When the rack has been loaded, it is lowered into vessel 3 and cover 7 is closed. Steam under the desired pressure is admitted to the chamber 5 to heat the vessel and the contents therein. Water is admitted into the vessel through pipe 18 whereby the food will be boiled. Whenever, during the cooking process, it is desired to flush away the scum or other undesirable matter which is released from the food while it is being boiled, valve 22 is opened and water is admitted through pipe 18 so that it will circulate upwardly through the vessel, overflow its top and pass into channel 20, from which it will be discharged through pipe 21. Whenever desired, the condition of this overflow water may be observed by opening the plug 24. After the food has been cooked the desired period, cock 29 will be opened to discharge the hot water from vessel 3 and valve 28 will be opened to admit cold water into the vessel 3, so that the cooked food will be subjected to the chilling action of the cold water. If desired, the cold water treatment can be continued as long as desired, the overflow escaping through pipe 21.

The invention exemplifies an improved steam cooker, in which provision is made for flushing the cooking to remove scum and other undesirable matter during the cooking process and without opening the casing to provide access for manual removal. By facilitating this flushing so that it can be conveniently done, as frequently desired, the quality of the cooked product is improved. The invention also makes provision for chilling the cooked product to close the pores therein and cause it to retain its juices.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a cooker, the combination of a closed vessel to hold the material to be cooked, means forming a steam chamber around said vessel, means to supply steam to said chamber to heat the vessel, and means to circulate water through the vessel to carry off undesirable matter while the vessel is closed.

2. In a cooker, the combination of a vessel to hold the material to be cooked, a closed casing around said vessel and provided with a steam chamber around the vessel, the top of the vessel being open to the casing, the casing comprising a removable top to provide access to the vessel, a wall adjacent the top of the vessel forming the top of the steam chamber, means to supply steam to said chamber to heat the vessel, and means to circulate water through the vessel to carry off undesirable matter while the vessel is closed.

3. In a cooker, the combination of a closed vessel to hold the material to be cooked, means in the vessel to separate the material being cooked, means forming a steam chamber around said vessel, means to supply steam to said chamber to heat the vessel, and means to circulate water through the vessel to carry off undesirable matter while the vessel is closed.

4. In a cooker, the combination of a closed vessel to hold the material to be cooked, a removable rack in the vessel to retain the food separated, means forming a steam chamber around said vessel, means to supply steam to said chamber to heat the vessel, and means to circulate water through the vessel to carry off undesirable matter while the vessel is closed.

5. In a cooker, the combination of a closed vessel to hold the material to be cooked, means forming a steam chamber around said vessel, means to supply steam to said chamber to heat the vessel, a wall between the vessel and said first mentioned means and disposed below the top of the vessel forming an overflow channel for water from the vessel, means to supply water to and overflow from the vessel into said channel, and an outlet connected to said channel.

Signed at Chicago, Illinois this 18th day of Apr., 1923.

JOHN F. WATERS.